(12) United States Patent
Bert et al.

(10) Patent No.: US 12,547,346 B2
(45) Date of Patent: Feb. 10, 2026

(54) BLOCK CACHING WITH QUEUE IDENTIFIERS

(71) Applicant: Micron Technology, Inc., Boise, ID (US)

(72) Inventors: Luca Bert, San Jose, CA (US); Sampath Ratnam, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/770,926

(22) Filed: Jul. 12, 2024

(65) Prior Publication Data

US 2025/0021267 A1    Jan. 16, 2025

Related U.S. Application Data

(60) Provisional application No. 63/526,513, filed on Jul. 13, 2023.

(51) Int. Cl.
*G06F 3/06* (2006.01)
*G06F 12/0868* (2016.01)

(52) U.S. Cl.
CPC .......... *G06F 3/0659* (2013.01); *G06F 3/0604* (2013.01); *G06F 3/064* (2013.01); *G06F 3/0647* (2013.01); *G06F 3/0679* (2013.01); *G06F 12/0868* (2013.01); *G06F 2213/0026* (2013.01)

(58) Field of Classification Search
None
See application file for complete search history.

(56) References Cited

U.S. PATENT DOCUMENTS

| | | | |
|---|---|---|---|
| 2011/0153911 A1* | 6/2011 | Sprouse | G06F 12/0871 711/119 |
| 2015/0378605 A1* | 12/2015 | Huang | H04L 67/1004 711/103 |
| 2019/0155760 A1* | 5/2019 | Chang | G06F 3/0659 |

(Continued)

FOREIGN PATENT DOCUMENTS

| | | | | | |
|---|---|---|---|---|---|
| CN | 112612424 A | * | 4/2021 | ......... | G06F 13/1668 |
| CN | 117453608 A | * | 1/2024 | ......... | G06F 13/4208 |
| KR | 20240105075 A | * | 7/2024 | ........... | G11C 7/1084 |

OTHER PUBLICATIONS

Translation of CN-112612424-A. 2025.*
Translation of CN-117453608-A. 2025.*
Translation of KR-20240105075-A. 2025.*

*Primary Examiner* — Nathan Sadler
(74) *Attorney, Agent, or Firm* — Schwegman Lundberg & Woessner, P.A.

(57) ABSTRACT

Various embodiments provide for block caching with queue identifiers on a memory system. In particular, when a write request to write host data is executed on a memory system that uses write/block caching and the host data is written to one or more cache blocks of a memory device of the memory system, the memory system can cause the queue identifier of the write request to be stored on the memory system in association with the host data. Subsequently, when the memory system moves (e.g., de-stages) data from one or more cache blocks (e.g., single-level cell (SLC) blocks) to one or more non-cache blocks (e.g., quad-level cell (QLC) blocks), the memory system can do so based on queue identifiers associated with host data written on one or more cache blocks of the memory system.

20 Claims, 5 Drawing Sheets

(56) References Cited

U.S. PATENT DOCUMENTS

| | | | |
|---|---|---|---|
| 2019/0187894 A1* | 6/2019 | Benisty | G06F 12/128 |
| 2024/0220158 A1* | 7/2024 | Kim | G06F 12/0238 |
| 2025/0021253 A1* | 1/2025 | Bert | G06F 3/064 |
| 2025/0021268 A1* | 1/2025 | Bert | G06F 3/0673 |
| 2025/0021269 A1* | 1/2025 | Bert | G06F 3/0659 |
| 2025/0077414 A1* | 3/2025 | Wang | G06F 12/0246 |

* cited by examiner

BLOCK CACHING WITH QUEUE IDENTIFIERS

PRIORITY APPLICATION

This application claims the benefit of priority to U.S. Provisional Application Ser. No. 63/526,513, filed Jul. 13, 2023, which is incorporated herein by reference in its entirety.

TECHNICAL FIELD

Embodiments of the disclosure relate generally to memory devices and, more specifically, to block caching on a memory system (e.g., the memory sub-system) with queue identifiers.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
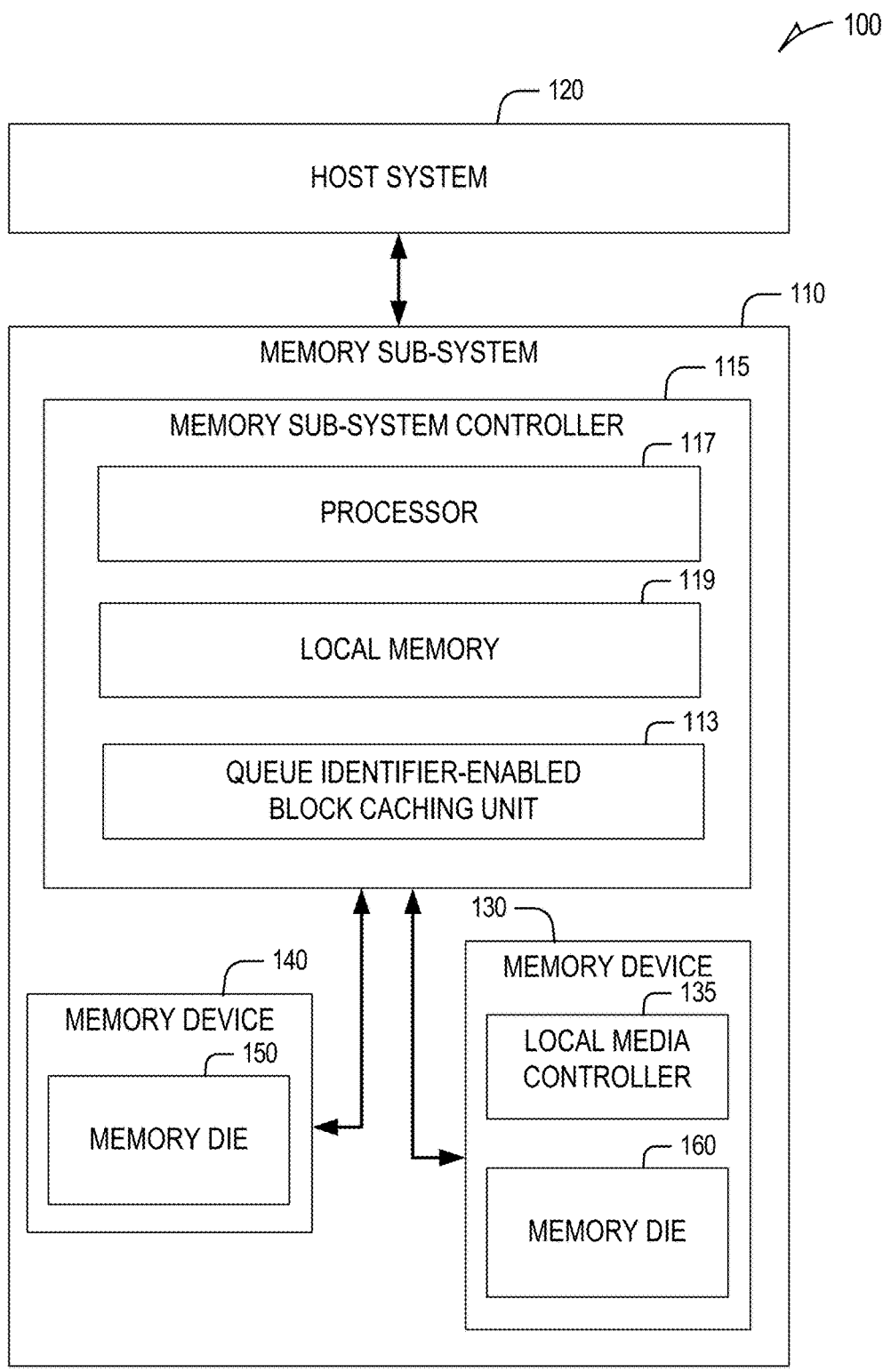
FIG. 1 is a block diagram illustrating an example computing system that includes a memory sub-system, in accordance with some embodiments of the present disclosure.

Aspects of the present disclosure are directed to block caching on a memory system (e.g., the memory sub-system) with queue identifiers. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can send access requests to the memory sub-system, such as to store data at the memory sub-system and to read data from the memory sub-system.

The host system can send access requests (e.g., write commands, read commands) to the memory sub-system, such as to store data on a memory device at the memory sub-system, read data from the memory device on the memory sub-system, or write/read constructs (e.g., such as submission and completion queues) with respect to a memory device on the memory sub-system. The data to be read or written, as specified by a host request (e.g., data access request or command request), is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., error-correcting code (ECC) codeword, parity code), data version (e.g., used to distinguish age of data written), valid bitmap (which LBAs or logical transfer units contain valid data), and so forth.

The memory sub-system can initiate media management operations, such as a write operation, on host data that is stored on a memory device. For example, firmware of the memory sub-system can re-write previously written host data from a location of a memory device to a new location as part of garbage collection management operations. The data that is re-written, for example as initiated by the firmware, is hereinafter referred to as "garbage collection data."

"User data" hereinafter generally refers to host data and garbage collection data. "System data" hereinafter refers to data that is created and/or maintained by the memory sub-system for performing operations in response to host requests and for media management. Examples of system data include, and are not limited to, system tables (e.g., logical-to-physical memory address mapping table (also referred to herein as a L2P table), data from logging, scratch pad data, and so forth).

A memory device can be a non-volatile memory device. A non-volatile memory device is a package of one or more die. Each die can be comprised of one or more planes. For some types of non-volatile memory devices (e.g., NOT-AND (NAND)-type devices), each plane is comprised of a set of physical blocks. For some memory devices, blocks are the smallest area that can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which are raw memory devices combined with a local embedded controller for memory management within the same memory device package.

The data can be stored in the memory sub-system according to zones (ZNS). Such a memory sub-system can be referred to as a zone-based memory sub-system or a zone memory sub-system. Various zones can be defined in the memory sub-system, each of which can be uniquely associated with a particular set of user data or an application. For example, a first zone can be associated with a first application (or user data identified as received from the first application) and a second zone can be associated with a second application. Host data or user data received from the first application can be stored by the memory sub-system in the first zone. The zones can be of equal or unequal size and can span the size of a single block on a die, multiple blocks on the die, an entire die or a set of dies of the memory sub-system. For example, each zone can span a respective set of blocks in a corresponding die or set of die rather than sequentially across a row of blocks, and a particular application can be associated with a given zone that spans a single die. User or host data associated with that application can be stored in that given zone on the single die. A zone can be defined in a memory sub-system in accordance with a NVM Express (NVMe) specification. For instance, a zone can be defined in a memory sub-system by one or more NVMe commands issued to the memory sub-system.

Certain memory devices, such as NAND-type memory devices, comprise one or more blocks, (e.g., multiple blocks), with each of those blocks comprising multiple memory cells. For instance, a memory device can comprise multiple pages (also referred as wordlines), with each page comprising a subset of memory cells of the memory device. Generally, writing data to such memory devices involves programming (by way of a program operation) the memory devices at the page level of a block, and erasing data from such memory devices involves erasing the memory devices at the block level (e.g., page level erasure of data is not possible).

A memory device can comprise one or more cache blocks and one or more non-cache blocks, where data written to the memory device is first written to one or more cache blocks, which can facilitate faster write performance; and data stored on the cache blocks can eventually be moved (e.g., copied) to one or more non-cache blocks at another time (e.g., a time when the memory device is idle), which can facilitate higher storage capacity on the memory device. A cache block can comprise a single-level cell (SLC) block that comprises multiple SLCs, and a non-cache block can comprise a multiple-layer cell (MLC) block that comprises multiple MLCs, a triple-level cell (TLC) block that comprises multiple TLCs, or a quad-level cell (QLC) block that comprises QLCs. Writing first to one or more SLCs blocks can be referred to as SLC write caching or SLC caching (also referred to as buffering in SLC mode). Generally, when using traditional full SLC caching, an SLC block is released of data after data is moved from the SLC block to a non-cache block (e.g., QLC block) and the non-cache block is verified to be free of errors.

A compaction (or a garbage collection) operation can be performed with respect to a cache block (containing one or more memory cells) of a memory device (e.g., NAND-type memory device), where the data stored in the cache block is copied (e.g., transferred) to a non-cache block. A compaction operation can be performed with respect to a set of cache blocks when, for instance, there are no available cache blocks to cache new data (e.g., cache new written data). As used herein, a block compaction operation is performed on a cache block and can comprise reading data stored on the cache block and writing the read data to a non-cache block (e.g., programming the non-cache block with the data read from the cache block), thereby copying the data from the cache block to the non-cache block An example block compaction operation can include a SLC-QLC block compaction operation. A block compaction operation can be performed, for instance, when available cache blocks on a memory device are full or nearing a fill limit.

For conventional memory devices that comprise NOT-AND (NAND) memory cells (hereafter referred to as NAND-type memory devices), writing and erasing sequentially generally leads to lower or reduced write amplification (e.g., a low write amplification factor (WAF)) and better data performance. While modern software on host systems (e.g., software applications, databases, and file systems) tend to read and write data sequentially with respect to a memory system (e.g., a memory sub-system coupled to a host system), when such software is executed by one or more multicore hardware processors of the host system, the sequentiality of data access request (e.g., read and write requests) to the memory system is usually lost. For instance, when modern software operates on one or more multicore hardware processors of a host system, a block layer of the host system typically divides work to be performed by each process (of the software) among two or more cores of a multicore hardware processor (e.g., in a way where work is uniformly divided across cores to achieve maximum throughput). While each core of a host system's hardware processor may still issue largely sequential data access requests to a memory system, the data access requests are usually intermingled (e.g., interleaved) with each other and appear random or pseudo-random from the perspective of the memory system. This can be due to data aggregation and request priority policy in a data link layer between the host system and the memory system. For instance, a memory system having a Non-Volatile Memory Express (NVMe) architecture is typically designed to have an out-of-order traffic handshake between the host system and a controller of the memory system for data performance reasons.

The architecture of conventional memory systems, such as those implemented by a NVMe standard, include multiple queues for processing data access requests (e.g., read and write requests) from host systems. For instance, a memory system based on a NVMe standard can comprise multiple pairs of queues, where each queue pair is associated with a different queue identifier (QID), and where each queue pair comprises a submission queue for incoming requests that need to be completed/processed and a completion queue for command requests already completed/processed by the memory system. As herein, a submission queue identifier (SQID) can refer to a submission queue of a given queue pair, and can be equal to the QID of the given queue pair. A QID can be included as a parameter (e.g., QID tag) in a data access request from a host system to a memory system, and can serve as a pointer to a submission queue on the memory system that is to receive the data access request. Generally, each core of a host system's hardware processor is individually associated with (e.g., assigned to, mapped to, attached to) a different QID (e.g., different queue pair on the memory system), and data access requests (e.g., read and write requests) from a given core are received and stored by a submission queue that has a queue identifier associated with the given core. Additionally, a given thread executing on a host system (e.g., of a software application or a database on the host system) tends to be started/run on the same core of the host system's hardware processor (e.g., threads on the host system tend to have core affinity). A given core of a host system's hardware processor can have multiple threads (e.g., four to five threads) that operate on and have affinity to the given core.

Aspects of the present disclosure are directed to block caching on a memory system (e.g., the memory sub-system) with queue identifiers. In particular, when a write request to write host data is executed on a memory system that uses write/block caching (e.g., SLC caching) and the host data is written to one or more cache blocks (e.g., of a memory device of the memory system), the memory system can cause the queue identifier of the write request to be stored on the memory system (e.g., stored on one or more cache blocks) in association with the host data (e.g., tag the host data with the queue identifier). Depending on the embodiment, the queue identifier can be stored on the one or more cache blocks with the written host data (e.g., in each page of a cache block or each cache block to which the host data is written) or stored in a separate storage space of the memory system (e.g., reserved data storage space of the memory system). Host data can be written to one or more cache blocks without considering (e.g., without filtering based on) queue identifiers of write requests. Subsequently, when the memory system moves (e.g., de-stages) data from one or more cache blocks (e.g., SLC blocks) to one or more non-cache blocks (e.g., QLC blocks), the memory system can do so based on queue identifiers associated with host data written on one or more cache blocks of the memory system.

Given that a select thread tends to issue data access requests with sequentiality, that the select thread has an affinity to a select core of a host system's hardware processor, and the select core is associated with a select submission queue of a memory system that has a select queue identifier, memory systems of various embodiments can use a queue identifier of a submission queue as a proxy for identifying one or more threads, each of which tends to generate or issue data access requests sequentially. The use of queue identifiers with block caching as described herein enable memory systems of various embodiments to identify one or more threads using queue identifiers, detect sequentiality of data access requests (of those one or more threads) based on queue identifiers, and manage host data on cached blocks in such a way that maintains at least some level of sequentiality of data access requests (e.g., read or write request) on non-cache blocks. Various embodiments described herein operate on a premise that write requests, generated by one or more threads operating on a given hardware processor core and stored in a given submission queue of a memory system, are likely correlated in a time span of interest (e.g., a time span that covers a page stripe length or a few seconds).

According to some embodiments, the memory system selects a single queue identifier (e.g., each queue identifier), determines (e.g., identifies) host data stored on one or more cache blocks and associated with the single queue identifier, and moves (e.g., de-stages) the determined host data from one or more cache blocks to one or more non-cache blocks (e.g., in order in which they were written to the one or more cache blocks). In this way, a memory system of an embodiment can implement queue identifier-filtering for moving (e.g., de-staging) host data originating from the same hardware processor core of a host system and, most likely, the same software application process running on the host system, to move from one or more cache blocks to sequential data locations on one or more non-cache blocks (e.g., sequential pages of one or more QLC blocks). Due to the nature of write requests from host-side file systems, host data moved (from one or more cache to one or more non-cache blocks) based on queue identifiers as described herein will have approximately the same life span and will be deleted at (or about) the same time. As a result, a memory system of an embodiment can lead to much lower fragmentation and, as a consequence, lower WAF on one or more memory devices of the memory system.

Host data associated with a single queue identifier can be moved from one or more cache blocks to one or more non-cache blocks in response to determining that that a set of conditions is satisfied for the host data. The set of conditions can include, for example, one or more of the following: when there are no additional (or close to no additional) cache blocks available for execution of new write requests by the memory system (e.g., when SLC cache is full, host data is moved by queue identifier); a number of cache blocks storing the stored host data surpasses a threshold number of cache blocks (e.g., enough cache blocks to fill a single non-cache block); and expiration of a period of wait time (e.g., with respect to a queue identifier).

For some embodiments, one or more cursors (e.g., one or more write cursors) are used for writing host data to a one or more non-cache blocks, where each cursor is assigned to a set of queue identifiers. For instance, where possible, a memory system can assign and use one write cursor per a unique queue identifier. If there are more queue identifiers than cursors (e.g., write cursors available) on a memory system, the memory system can assign multiple queue identifiers per a cursor (e.g., write cursor). As a result, most cursors of a memory system can be associated with large swatches of host data on non-cache blocks that are both sequential and expected to be deleted at (or about) the same time.

As used herein, a cursor mechanism (or cursor) of a memory system can comprise a mechanism used by the memory system to track a current position (e.g., memory address, such as LBA) in a memory device (of the memory system) for a write access purpose, for a read access purpose, or both, where the current position can point to an individual block (e.g., cache block or non-cache block) in the memory device. A memory system can have multiple cursors, and can have a separate cursor for writing data and for reading data. A processing device (e.g., memory controller) of a memory system can control each cursor mechanism and can update the location to which they point in a memory device for data access (e.g., read or write access).

Overall, the use of various embodiments described herein result in larger sequential storage (e.g., organization) of data, having common queue identifiers, on a memory system (e.g., on non-cache blocks of the memory system). In other words, various embodiments can organize data on a memory system conditioned upon queue identifiers (e.g., SQID) and, in doing so, can protect data sequentially provided by submission queues. The sequential storage (e.g., organization) of data having common queue identifiers can result in lower write amplification, higher performance of the memory system, higher performance per a unit of power (e.g., watt), or some combination thereof.

Data access request and command request are used interchangeably herein. As used herein, a data access request/command request can comprise a data access command for a memory system. Accordingly, a write request can comprise a write command for a memory system, and a read request can comprise a read command for a memory system.

As used herein, a superblock of a memory device (e.g., of a memory system) comprises a plurality (e.g., collection or grouping) of blocks of the memory device. For example, a superblock of a NAND-type memory device can comprise a plurality of blocks that share a same position in each plane in each NAND-type memory die of the NAND-type memory device.

Disclosed herein are some examples of block caching on a memory system (e.g., the memory sub-system) with queue identifiers, as described herein.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., a peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a SATA interface, a peripheral component interconnect express (PCIe) interface, USB interface, Fibre Channel, Serial Attached SCSI (SAS), Small Computer System Interface (SCSI), a double data rate (DDR) memory bus, a DIMM interface (e.g., DIMM socket interface that supports DDR), Open NAND Flash Interface (ONFI), DDR, Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random-access memory (SDRAM).

Some examples of non-volatile memory devices (e.g., memory device 130) include a NAND type flash memory and write-in-place memory, such as a three-dimensional (3D) cross-point memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional (2D) NAND and 3D NAND.

Each of the memory devices 130 can include one or more arrays of memory cells. One type of memory cell, for example, SLCs, can store one bit per cell. Other types of memory cells, such as MLCs, TLCs, QLCs, and penta-level cells (PLCs), can store multiple or fractional bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

As used herein, a block comprising SLCs can be referred to as a SLC block, a block comprising MLCs can be referred to as a MLC block, a block comprising TLCs can be referred to as a TLC block, and a block comprising QLCs can be referred to as a QLC block.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide-based RRAM (OxRAM), negative- or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and so forth. The local memory 119 can also include ROM for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands, requests, or operations from the host system 120 and can convert the commands, requests, or operations into instructions or appropriate commands to achieve the desired access to the memory devices 130 and/or the memory device 140. The memory sub-system controller 115 can be responsible for other operations such as wear leveling operations, garbage collection operations, error detection and ECC operations, encryption operations, caching operations, and address translations between a logical address (e.g., LBA, namespace) and a physical memory address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 as well as convert responses associated with the memory devices 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device.

Each of the memory devices 130, 140 include a memory die 150, 160. For some embodiments, each of the memory devices 130, 140 represents a memory device that comprises a printed circuit board, upon which its respective memory die 150, 160 is solder mounted.

The memory sub-system controller 115 includes a queue identifier-enabled block caching unit 113 that enables or facilitates the memory sub-system controller 115 block caching with queue identifiers as described herein. For some embodiments, the queue identifier-enabled block caching unit 113 can be part of a larger queue identifier-based request processor (not shown). Alternatively, some or all of the queue identifier-enabled block caching unit 113 is included by the local media controller 135, thereby enabling the local media controller 135 to enable or facilitate block caching with queue identifiers as described herein.

Figure 2:
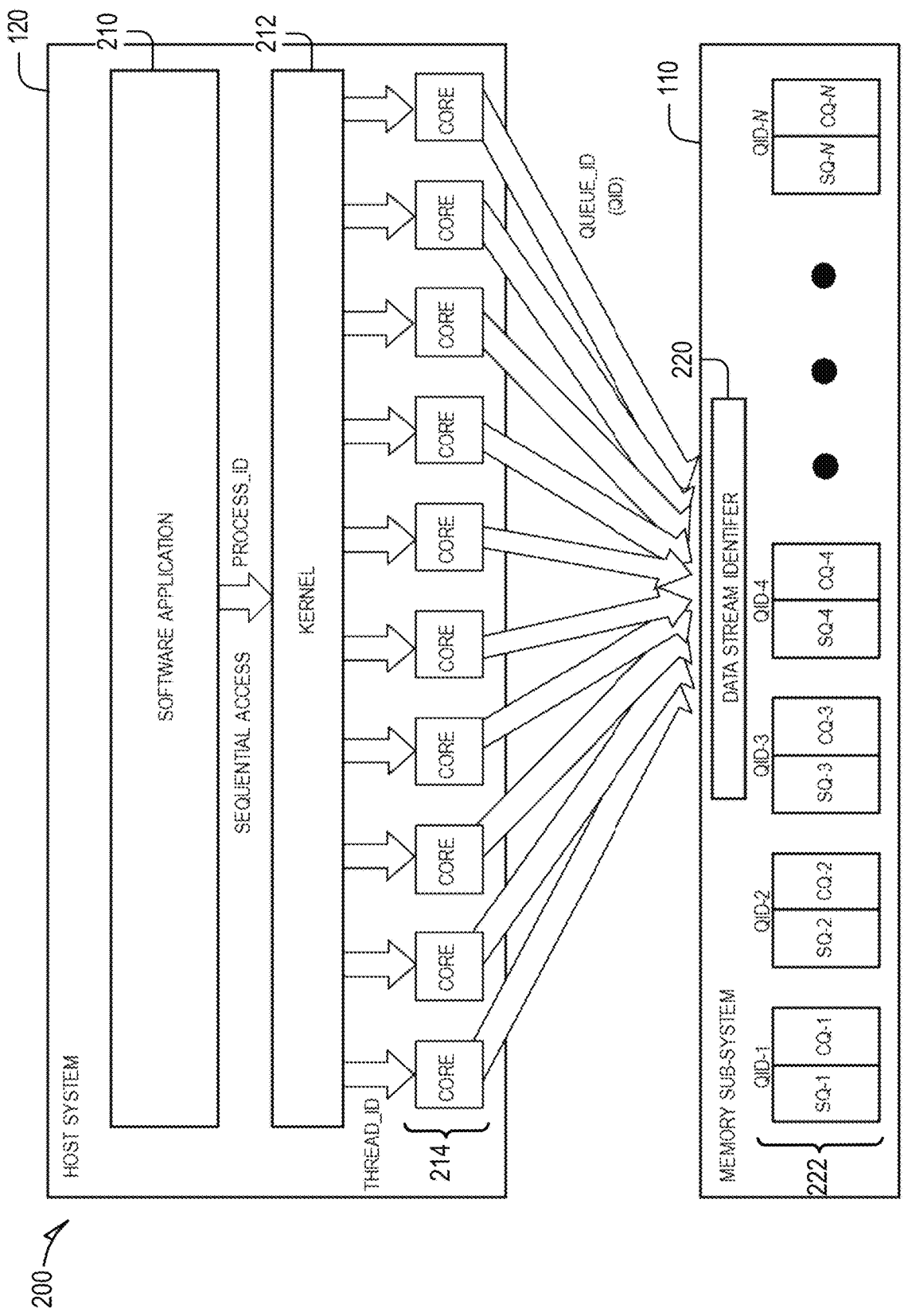
FIG. 2 is a diagram illustrating an example architecture of a host system and a memory sub-system, in accordance with some embodiments of the present disclosure.

FIG. 2 is a diagram illustrating an example architecture 200 of the host system 120 and the memory sub-system 110 of FIG. 1, in accordance with some embodiments of the present disclosure. In the example architecture 200, the host system 120 comprises multiple hardware processor cores 214, a software application 210 operating on the multiple hardware processor cores 214, and a kernel 212 (e.g., of an operating system) operating on the multiple hardware processor cores 214. Additionally, in the example architecture 200, the memory sub-system 110 comprises a data stream identifier 220 (e.g., which is part of a queue identifier-based request processor having a unique QID) and multiple pairs of queues 222, which include queues pairs associated with queue identifier-1 (QID-1) through queue identifier-N (QID-N). The queue pair associated with queue identifier-1 (QID-1) comprises a submission queue 1 (SQ-1) and a completion queue (CQ-1), the queue pair associated with queue identifier-2 (QID-2) comprises a submission queue-2 (SQ-2) and a completion queue (CQ-2), the queue pair associated with queue identifier-3 (QID-3) comprises a submission queue-3 (SQ-3) and a completion queue (CQ-3), the queue pair associated with queue identifier-4 (QID-4) comprises a submission queue-4 (SQ-4) and a completion queue (CQ-4), and so on. During operation, the software application 210 can cause execution of processes (having process identifiers (PROCESS_IDs)) by the kernel 212, where one or more of the processes can involve generation of sequential data access requests. The kernel 212 can execute at least one of the processes by dividing the process into multiple threads (each having a thread identifier (THREAD_ID)) to be executed by the multiple hardware processor cores 214. Each of the threads can be assigned for execution by one of the multiple hardware processor cores 214 (e.g., according to core affinity), and execution of a thread by a given hardware processor core can cause the given hardware processor core to generate and issue one or more data access requests to the memory sub-system 110, where each generated/issued data access request includes a queue identifier (QID) of the given hardware processor core.

As data access requests are generated and issued by the multiple hardware processor cores 214, the data access requests from each hardware processor core can be interleaved with those generated and issued by one or more other hardware processor cores. Accordingly, the data access request received by the memory sub-system 110 can appear random or pseudo-random to the memory sub-system 110.

Upon receiving a given data access request, the memory sub-system 110 can use the data stream identifier 220 to determine a given queue identifier of the given data access request, and the memory sub-system 110 can cause the given data access request to be stored in a submission queue (e.g., stored to an entry added to the submission queue) of the queue pair (of the multiple pairs of queues 222) that corresponds to (e.g., matches) the given queue identifier. When the given data access request has been processed (e.g., executed) by the memory sub-system 110, the results of the given data access request can be stored (e.g., queued) to a completion queue (e.g., stored to an entry added to the completion queue) of the queue pair (of the multiple pairs of queues 222) that corresponds to (e.g., matches) the given queue identifier, from which the host system 120 can obtain (e.g., collect) the results.

Figure 3:
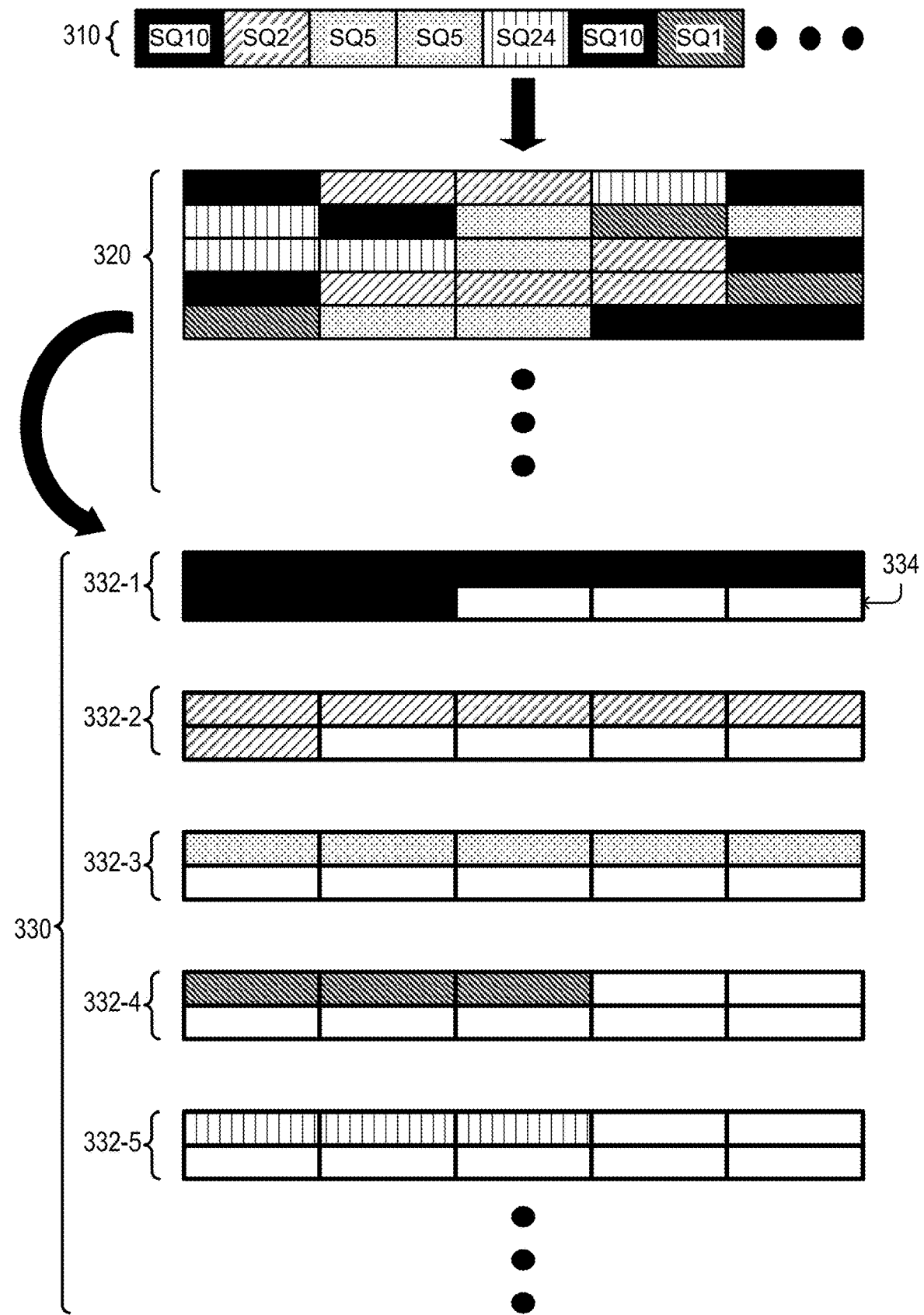
FIG. 3 illustrates an example of block caching on a memory system with queue identifiers, in accordance with some embodiments of the present disclosure.

FIG. 3 illustrates an example of block caching on a memory system with queue identifiers, in accordance with some embodiments of the present disclosure. In particular, FIG. 3 illustrates a write data stream 310, a plurality of cache blocks 320 of a memory device (e.g., 130, 140) of a memory system (e.g., the memory sub-system 110), and a plurality of non-cache blocks 330 of the memory device. For various embodiments, the plurality of cache blocks 320 implements a cache layer on the memory system, and the plurality of non-cache blocks 330 implements a non-cache layer on the memory system. An example of an empty block is represented by block 334. As shown, the write data stream 310 comprises a random or pseudo random stream of write requests (to write respective host data) that each have a queue identifier (e.g., SQ10, SQ2, SQ5, SQ24, SQ10, and SQ1) associated with (e.g., corresponding to) a submission queue of a memory system. According to some embodiments, as individual write requests from the write data stream 310 are executed, respective host data is written to individual cache blocks of the plurality of cache blocks 320. Eventually, a processing device (e.g., the processor 117) of the memory system can determine that a set of conditions is satisfied with respect to moving host data associated with a given queue identifier (e.g., SQ2) from one or more of the plurality of cache blocks 320 to one or more of the plurality of non-cache blocks 330. In response to this determination, the processing device can cause host data stored on the one or more of the plurality of cache blocks 320 to be moved the one or more of the plurality of non-cache blocks 330. For instance, the processing device can cause sufficient host data from the one or more of the plurality of cache blocks 320 (e.g., host data from four SLC cache blocks) to be moved to fill (rather than partially fill) one or more non-cache blocks of the plurality of non-cache blocks 330 (e.g., to fill one QLC non-cache block). According to some embodiments, the memory system comprises or supports a set of write cursor mechanisms, where each write cursor mechanism is configured to track a current position for writing to one of the set of non-cache blocks (e.g., one queue identifier per a write cursor mechanism, or multiple queue identifiers per a write cursor mechanism when there are more queue identifiers than write cursor mechanisms). For instance, as shown in FIG. 4, host data associated with SQ10 can be assigned to a write cursor mechanism that tracks writing the host data to non-cache blocks of a collection of blocks 332-1, host data associated with SQ2 can be assigned to a write cursor mechanism that tracks writing the host data to non-cache blocks of a collection of blocks 332-2, host data associated with SQ5 can be assigned to a write cursor mechanism that tracks writing the host data to non-cache blocks of a collection of blocks 332-3, host data associated with SQ1 can be assigned to a write cursor mechanism that tracks writing the host data to non-cache blocks of a collection of blocks 332-4, and host data associated with SQ24 can be assigned to a write cursor mechanism that tracks writing the host data to non-cache blocks of a collection of blocks 332-5.

Figure 4:
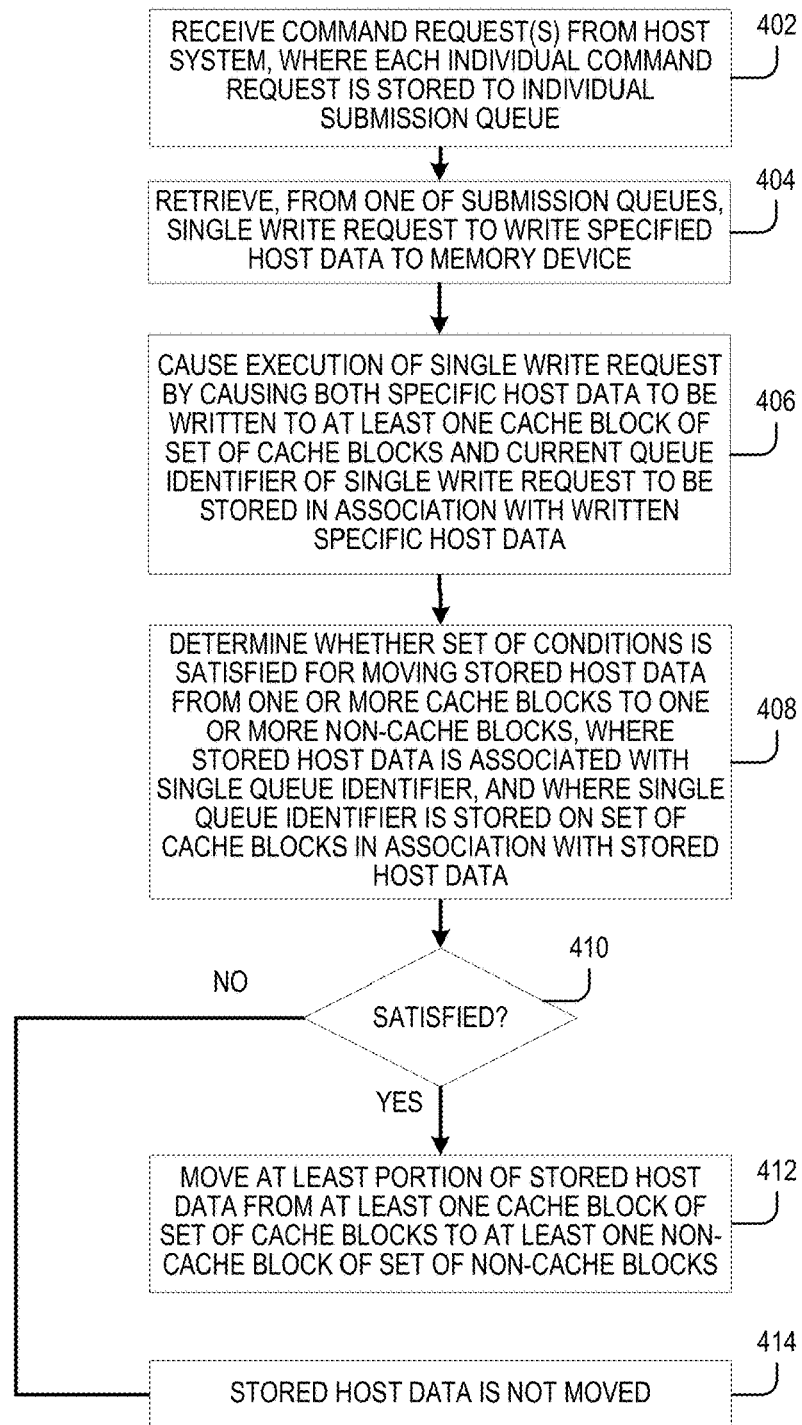
FIG. 4 is a flow diagram of an example method for block caching with queue identifiers, in accordance with some embodiments of the present disclosure.

FIG. 4 is a flow diagram of an example method 400 for block caching with queue identifiers, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the memory sub-system controller 115 of FIG. 1 based on the queue identifier-enabled block caching unit 113. Additionally, or alternatively, for some embodiments, the method 400 is performed, at least in part, by the local media controller 135 of the memory device 130 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. Other process flows are possible.

Referring now to the method 400 of FIG. 4, at operation 402, a processing device (e.g., the processor 117 of the memory sub-system controller 115) receives a set of command requests from a host system (e.g., 120), where each individual command request in the set of command requests is stored to an individual submission queue of a memory system (e.g., the memory sub-system 110) associated with (e.g., that corresponds to) an individual queue identifier of the individual command request. For some embodiments, a command request received from the host system comprises a queue identifier (e.g., includes a QID tag) associated with the command request (e.g., based on the host-side submission queue from which the command request was sent).

Subsequently, at operation 404, the processing device (e.g., the processor 117) retrieves, from one of a plurality of submission queues of the memory system (e.g., the memory sub-system 110), a single write request to write specific host data to a memory device (e.g., 130, 140) of the memory system. For some embodiments, operation 404 is performed as part of the processing device (e.g., the processor 117) scanning one or more submission queues (e.g., scan each submission queue) of the memory system (e.g., the memory sub-system 110) for command requests to be executed.

At operation 406, the processing device (e.g., the processor 117) causes execution of the single write request (retrieved by operation 404) by causing both the specific host data to be written to at least one cache block of the memory device (e.g., 130, 140) of the memory system and a current queue identifier of the single write request to be stored in association with the written specific host data (e.g., the specific host data written to the at least one cache block). For example, the current queue identifier can be stored on (e.g., written to) the at least one cache block with the specific host data, such in each page (of a cache block) or in each cache block to which the specific host data is written. Additionally, the current queue identifier can be stored in metadata of the specific host data that is written. Alternatively, for some embodiments, the current queue identifier is stored on the memory system in a separate storage space of the memory system (e.g., reserved data storage space that is separate from the cache blocks of the memory system) while remaining associated with the specific host data. By storing the current queue identifier in association with the specific host data written to the at least one cache block (e.g., tagging the written specific host data with the current queue identifier), various embodiments can enable subsequent queue identifier-based movement (e.g., de-staging) of host data from one or more cache blocks to one or more non-cache blocks as described herein.

As described herein, the memory system can comprise multiple submission queues with each submission queue being associated with a different queue identifier (e.g., different SQID). For some embodiments, operations 402, 404 406 are performed with respect to each of two or more (e.g., all) queue identifiers of the memory system.

For operation 408, the processing device (e.g., the processor 117) determines whether a set of conditions is satisfied for moving stored host data, associated with a single queue identifier, from one or more cache blocks on the memory device (e.g., 130, 140) to one or more non-cache blocks on the memory device (e.g., 130, 140). For various embodiments, the single queue identifier is stored on the memory system (e.g., on the one or more cache blocks) in association with the stored host data on the one or more cache blocks. Additionally, for some embodiments, the single queue identifier is associated with a single submission queue of the memory system. The set of conditions can include, for example, one or more of the following: when there are no additional (or close to no additional) cache blocks available for execution of new write requests by the memory system (e.g., when SLC cache is full, host data is moved by queue identifier); a number of cache blocks storing the stored host data surpasses a threshold number of cache blocks (e.g., enough cache blocks to fill a single non-cache block); and expiration of a period of wait time (e.g., with respect to a queue identifier).

Accordingly, for various embodiments, during operation 408, the processing device (e.g., the processor 117) determines whether a number of cache blocks storing the stored host data surpasses a threshold number of cache blocks and, in response to determining that the number of cache blocks surpasses the threshold number of cache blocks, the processing device determines that the set of conditions is satisfied. For various embodiments, a single cache block stores less data than a single non-cache block, and the number of cache blocks can be set such that moving data from a set of source cache blocks to a set of destination non-cache blocks results in each non-cache block in the set of destination non-cache blocks being filled. For example, the threshold number of cache blocks can be set or defined such that one or more QLC non-cache blocks (e.g., a single QLC non-cache block) can be filled (rather than just partially filled) by host data from multiple SLC cache blocks. This can be beneficial when a non-cache block comprises a QLC block (or similar block) where there is a preference that data is written in one instance (e.g., due to weaker memory cells, several voltage levels, or slower write speeds). Where one or more non-cache blocks of the memory device (e.g., 130, 140) are part of a superblock (hereafter, a non-cache superblock) of the memory device, the number of cache blocks can be set such that moving data from a set of source cache blocks to a set of destination non-cache superblocks results in each non-cache superblock in the set of destination non-cache superblocks being filled. For some embodiments, operation 408 is performed with respect to each of two or more (e.g., all) queue identifiers of the memory system, such as when the memory system (e.g., the processing device) determines that there are no available cache blocks to cache new data (e.g., cache new written data).

At decision point 410, if it is determined that the set of conditions is not satisfied for moving the stored host data, the method 400 proceeds to operation 414, where no portion of the stored host data is moved from the one or more cache blocks to the one or more non-cache blocks. However, if it is determined that the set of conditions is satisfied for moving the stored host data, the method 400 proceeds to operation 412, where the processing device (e.g., the processor 117) moves at least a portion of the stored host data from at least one cache block of the memory device (e.g., 130, 140) to at least one non-cache block of the memory device (e.g., 130, 140). The movement of the at least a portion of the stored host data (from at least one cache block of the memory device to at least one non-cache block of the memory device) is performed by (or as part of) a compaction operation performed on the at least one cache block.

For some embodiments, during operation 412, moving the at least a portion of the stored host data (from the at least one cache block) to the at least one non-cache block comprises storing the single queue identifier in association with the at least a portion of the stored host data moved to the at least one non-cache block. This can be achieved, for instance, by storing the single queue identifier on (e.g., writing the single queue identifier to) the at least one non-cache block with the at least a portion of the stored host data written to the at least one non-cache block. Additionally, the single queue identifier can be stored in metadata of the at least a portion of the stored host data written to the at least one non-cache block. By storing the single queue identifier on the at least one non-cache block with the at least a portion of the stored host data, various embodiments can enable subsequent garbage collection of one or more non-cache blocks based on queue identifiers (e.g., aggregation and relocation of non-cache blocks associated with a queue identifier to a sequential/series of destination non-cache blocks). After the at least a portion of the stored host data is moved from the at least one cache block to the at least one non-cache block (by operation 412), the at least a portion of the stored host data can be erased from the at least one non-cache block.

For some embodiments, the memory device (e.g., 130, 140) comprises a set of non-cache superblocks, where each non-cache superblock comprises multiple non-cache blocks. In some such embodiments, moving the at least a portion of the stored host data from the at least one cache block to the at least one non-cache block can comprise moving the at least a portion of the stored host data from the at least one cache block to at least one non-cache superblock of the memory device, where the at least one non-cache superblock comprises the at least one non-cache block. Additionally, the single queue identifier can be stored on the memory system (e.g., the memory sub-system 110) in association with data written to the at least one non-cache superblock. For instance, the single queue identifier can be stored on (e.g., written to) the at least one non-cache superblock. For example, the single queue identifier can be stored on the at least one non-cache superblock as a tag. Where host data associated with multiple queue identifiers are stored within a given non-cache superblock, the given non-cache superblock can be tagged with each of the queue identifiers.

For some embodiments, the memory device (e.g., 130, 140) comprises a set of zones (hereafter, non-cache zones) that each comprise multiple non-cache blocks. In some such embodiments, moving the at least a portion of the stored host data from the at least one cache block to the at least one non-cache block can comprise moving the at least a portion of the stored host data from the at least one cache block to at least one non-cache zone of the memory device, where the at least one non-cache zone comprises the at least one non-cache block. Further, the single queue identifier can be stored on the memory system (e.g., the memory sub-system 110) in association with data written to the at least one non-cache zone. For example, the single queue identifier can be stored on (e.g., written to) the at least one non-cache zone. For instance, the single queue identifier can be stored on the at least one non-cache zone as a tag. Where host data associated with multiple queue identifiers are stored within a given non-cache zone, the given non-cache zone can be tagged with each of the queue identifiers.

To facilitate writing of data to cache blocks, non-cache blocks, or both, the memory system (e.g., the memory sub-system 110) can comprise or support a set of cursor mechanisms, such as write cursor mechanisms. For instance, a memory system can read and collect host data from a cache block, and can use a write cursor mechanism of the memory system to write collected host data to a non-cache block. For some embodiments, the memory system comprises or supports a set of write cursor mechanisms, where each write cursor mechanism is configured to track a current position for writing to one of the set of non-cache blocks. Additionally, for some embodiments, each write cursor mechanism is configured to track a current position for writing to one of the set of non-cache blocks in connection with a different set of queue identifiers (e.g., a different single queue identifier). According to some embodiments, the processing device (e.g., the processor 117) assigns one or more queue identifiers to a given write cursor mechanism for writing to cache blocks, and can do so dynamically (e.g., based on resources available on the memory system). For instance, if there are less queue identifiers than there are write cursor mechanisms available on the memory system, then each queue identifier can be assigned to a different write cursor mechanism. However, if there are more queue identifiers than there are write cursor mechanisms available on the memory system, then multiple queue identifiers can be assigned to a given write cursor mechanism (e.g., some queue identifiers share a write cursor mechanism). Where multiple queue identifiers are assigned to a given write cursor mechanism and the given write cursor mechanism points to a non-cache block a collection of non-cache blocks (e.g., a non-cache superblock or a non-cache zone), the collection of non-cache blocks can end up storing host data associated with a mix of queue identifiers.

Figure 5:
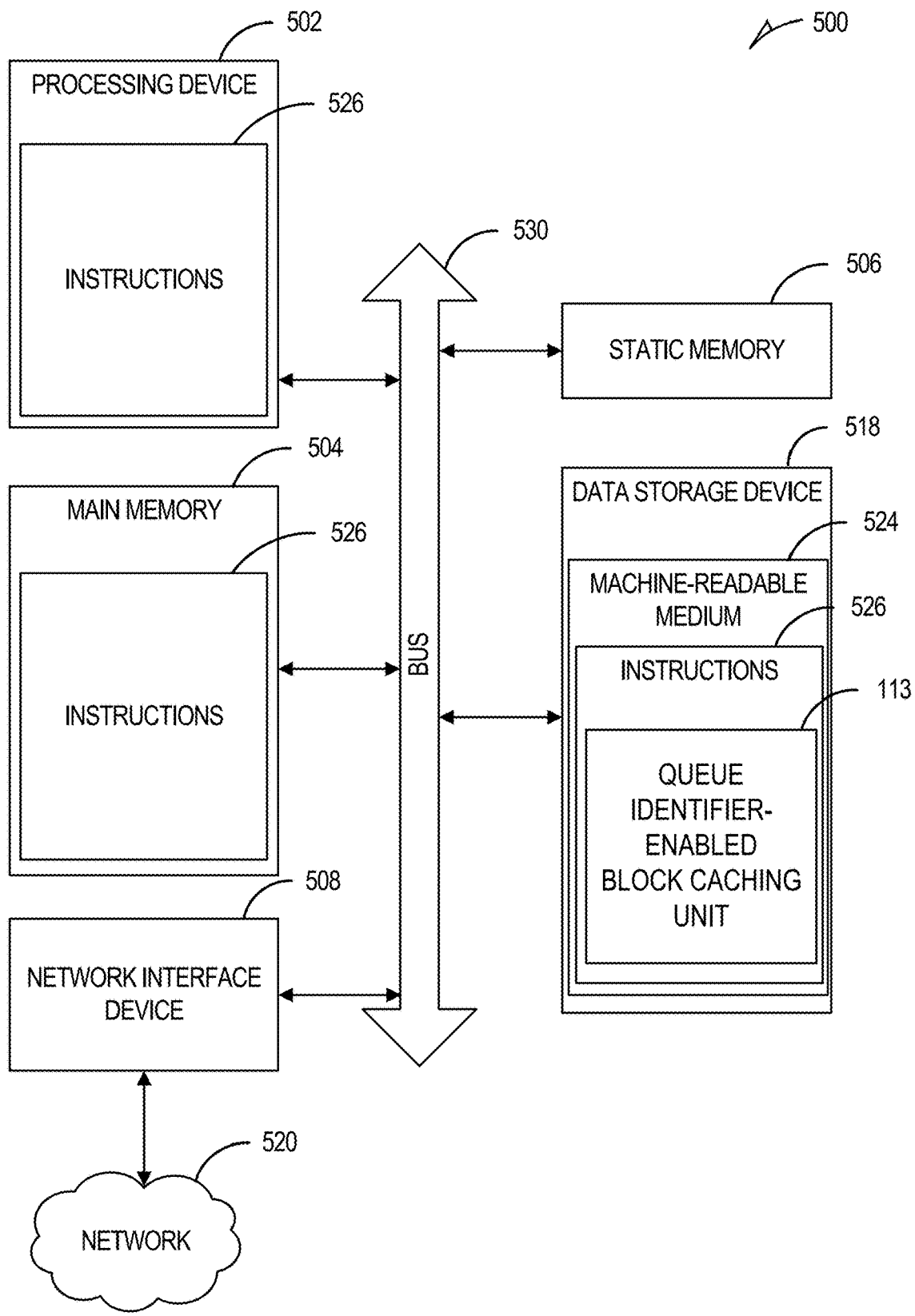
FIG. 5 is a block diagram of an example computer system in which embodiments of the present disclosure may operate.

FIG. 5 illustrates an example machine in the form of a computer system 500 within which a set of instructions can be executed for causing the machine to perform any one or more of the methodologies discussed herein. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations described herein. In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., ROM, flash memory, DRAM such as SDRAM or Rambus DRAM (RDRAM), etc.), a static memory 506 (e.g., flash memory, static random access memory (SRAM), etc.), and a data storage device 518, which communicate with each other via a bus 530.

The processing device 502 represents one or more general-purpose processing devices such as a microprocessor, a central processing unit, or the like. More particularly, the processing device 502 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 502 can also be one or more special-purpose processing devices such as an application-specific integrated circuit (ASIC), a field programmable gate array (FPGA), a digital signal processor (DSP), a network processor, or the like. The processing device 502 is configured to execute instructions 526 for performing the operations and steps discussed herein. The computer system 500 can further include a network interface device 508 to communicate over a network 520.

The data storage device 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage device 518, and/or main memory 504 can correspond to the memory sub-system 110 of FIG. 1.

In one embodiment, the instructions 526 include instructions to implement functionality corresponding to block caching with queue identifiers as described herein (e.g., the queue identifier-enabled block caching unit 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, ROMs, RAMS, EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium (e.g., non-transitory machine-readable medium) having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, and so forth.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   determining, by a processing device of a memory sub-system, that a set of conditions is satisfied for moving stored host data associated with a single queue identifier from one or more cache blocks of the memory sub-system to one or more non-cache blocks of the memory sub-system, the single queue identifier being stored on the set of cache blocks in association with the stored host data, the single queue identifier being associated with a single submission queue of a plurality of submission queues of the memory sub-system, each submission queue of the plurality of submission queues being associated with a corresponding queue identifier, each queue identifier being associated with at least one hardware processor core of a host system;
   in response to determining that the set of conditions is satisfied for moving the stored host data, moving, by the processing device, at least a portion of the stored host data from at least one cache block of the set of cache blocks to at least one non-cache block of the set of non-cache blocks;
   receiving, by the processing device, a set of command requests from the host system, each individual command request in the set of command requests including an individual queue identifier and being stored to an individual submission queue of the plurality of submission queues associated with the individual queue identifier;
   retrieving, by the processing device and from one of the plurality of submission queues, a single write request to write specific host data to a memory device of the memory sub-system; and
   causing execution of the single write request by causing both:
      the specific host data to be written to at least one cache block of the set of cache blocks; and
      a current queue identifier of the single write request to be stored on the memory device in association with the specific host data written to the at least one cache block.

2. The method of claim 1, wherein the set of cache blocks comprises one or more single-level cell (SLC) blocks, and the set of non-cache blocks comprises one or more multi-level cell (MLC) blocks, triple-level cell (TLC) blocks, or quad-level cell (QLC) blocks.

3. A system comprising:
   a plurality of submission queues, each submission queue of the plurality of submission queues being associated with a corresponding queue identifier, each queue identifier being associated with at least one hardware processor core of a host system;
   a memory device comprising a plurality of blocks, the plurality of blocks comprising a set of cache blocks and a set of non-cache blocks; and
   a processing device, operatively coupled to the memory device, configured to perform operations comprising:
      determining whether a set of conditions is satisfied for moving stored host data associated with a single queue identifier from one or more cache blocks to one or more non-cache blocks, the single queue identifier being stored on the system in association with the stored host data, the single queue identifier being associated with a single submission queue of the plurality of submission queues;
      in response to determining that the set of conditions is satisfied for moving the stored host data, moving at least a portion of the stored host data from at least one cache block of the set of cache blocks to at least one non-cache block of the set of non-cache blocks;
      receiving a set of command requests from the host system, each individual command request in the set of command requests including an individual queue identifier and being stored to an individual submission queue of the plurality of submission queues associated with the individual queue identifier;
      retrieving, from one of the plurality of submission queues, a single write request to write specific host data to the memory device; and causing execution of the single write request by causing both:
  the specific host data to be written to at least one cache block of the set of cache blocks; and
  a current queue identifier of the single write request to be stored on the memory device in association with the specific host data written to the at least one cache block.

4. The system of claim 3, wherein the determining of whether the set of conditions for moving the stored host data comprises:
  determining whether a number of cache blocks storing the stored host data surpasses a threshold number of cache blocks; and
  in response to determining that the number of cache blocks surpasses the threshold number of cache blocks, determining that the set of conditions is satisfied.

5. The system of claim 4, wherein a single cache block stores less data than a single non-cache block, and wherein the number of cache blocks is set such that moving data from a set of source cache blocks to a set of destination non-cache blocks results in each non-cache block in the set of destination non-cache blocks being filled.

6. The system of claim 3, wherein the moving of the at least a portion of the stored host data from the at least one cache block to the at least one non-cache block comprises storing the single queue identifier in association with the at least a portion of the stored host data moved to the at least one non-cache block.

7. The system of claim 3, wherein the memory device comprises a set of non-cache superblocks, wherein each non-cache superblock comprises multiple non-cache blocks from the set of non-cache blocks, and wherein the moving of the at least a portion of the stored host data from the at least one cache block to the at least one non-cache block comprises:
  moving the at least a portion of the stored host data from the at least one cache block to at least one non-cache superblock of the set of non-cache superblocks, the at least one non-cache superblock comprising the at least one non-cache block, the at least one non-cache superblock being associated with the single queue identifier.

8. The system of claim 7, wherein the determining of whether the set of conditions for moving the stored host data comprises:
  determining whether a number of cache blocks storing the stored host data surpasses a threshold number of cache blocks, the number of cache blocks being set such that moving data from a set of source cache blocks to a set of destination non-cache superblocks results in each non-cache superblock in the set of destination non-cache superblocks being filled; and
  in response to determining that the number of cache blocks surpasses the threshold number of cache blocks, determining that the set of conditions is satisfied.

9. The system of claim 7, wherein the moving of the at least a portion of the stored host data from the at least one cache block to the at least one non-cache superblock comprises storing the single queue identifier in association with data written to the at least one non-cache superblock.

10. The system of claim 3, wherein the memory device comprises a set of non-cache zones, wherein each non-cache zone comprises multiple non-cache blocks from the set of non-cache blocks, and wherein the moving of the at least a portion of the stored host data from the at least one cache block to the at least one non-cache block comprises:
  moving the at least a portion of the stored host data from the at least one cache block to at least one non-cache zone of the set of non-cache zones, the at least one non-cache zone comprising the at least one non-cache block, the at least one non-cache zone being associated with the single queue identifier.

11. The system of claim 10, wherein the moving of the at least a portion of the stored host data from the at least one cache block to the at least one non-cache zone comprises storing the single queue identifier in association with the at least one non-cache zone.

12. The system of claim 3, comprising a plurality of write cursor mechanisms, each write cursor mechanism being configured to track a current position for writing to one of the set of non-cache blocks in connection with a different set of queue identifiers.

13. The system of claim 3, wherein the set of cache blocks comprises one or more single-level cell (SLC) blocks, and the set of non-cache blocks comprises one or more multi-level cell (MLC) blocks, triple-level cell (TLC) blocks, or quad-level cell (QLC) blocks.

14. At least one non-transitory machine-readable storage medium comprising instructions that, when executed by a processing device of a memory sub-system, cause the processing device to perform operations comprising:
  determining whether a set of conditions is satisfied for moving stored host data associated with a single queue identifier from one or more cache blocks of the memory sub-system to one or more non-cache blocks of the memory sub-system, the single queue identifier being stored on the memory sub-system in association with the stored host data, the single queue identifier being associated with a single submission queue of a plurality of submission queues of the memory sub-system, each submission queue of the plurality of submission queues being associated with a corresponding queue identifier, each queue identifier being associated with at least one hardware processor core of a host system;
  in response to determining that the set of conditions is satisfied for moving the stored host data, moving at least a portion of the stored host data from at least one cache block of the set of cache blocks to at least one non-cache block of the set of non-cache blocks;
  receiving a set of command requests from the host system, each individual command request in the set of command requests including an individual queue identifier and being stored to an individual submission queue of the plurality of submission queues associated with the individual queue identifier;
  retrieving, from one of the plurality of submission queues, a single write request to write specific host data to a memory device of the memory sub-system; and
  causing execution of the single write request by causing both:
    the specific host data to be written to at least one cache block of the set of cache blocks; and
    a current queue identifier of the single write request to be stored on the memory device in association with the specific host data written to the at least one cache block.

15. The at least one non-transitory machine-readable storage medium of claim 14, wherein the determining of whether the set of conditions for moving the stored host data comprises:
  determining whether a number of cache blocks storing the stored host data surpasses a threshold number of cache blocks; and in response to determining that the number of cache blocks surpasses the threshold number of cache blocks, determining that the set of conditions is satisfied.

16. The at least one non-transitory machine-readable storage medium of claim 14, wherein the moving of the at least a portion of the stored host data from the at least one cache block to the at least one non-cache block comprises storing the single queue identifier in association with the at least a portion of the stored host data moved to the at least one non-cache block.

17. The at least one non-transitory machine-readable storage medium of claim 14, wherein the memory device comprises a set of non-cache superblocks, wherein each non-cache superblock comprises multiple non-cache blocks from the set of non-cache blocks, and wherein the moving of the at least a portion of the stored host data from the at least one cache block to the at least one non-cache block comprises:

moving the at least a portion of the stored host data from the at least one cache block to at least one non-cache superblock of the set of non-cache superblocks, the at least one non-cache superblock comprising the at least one non-cache block, the at least one non-cache superblock being associated with the single queue identifier.

18. The at least one non-transitory machine-readable storage medium of claim 17, wherein the moving of the at least a portion of the stored host data from the at least one cache block to the at least one non-cache superblock comprises storing the single queue identifier in association with data written to the at least one non-cache superblock.

19. The at least one non-transitory machine-readable storage medium of claim 14, wherein the memory device comprises a set of non-cache zones, wherein each non-cache zone comprises multiple non-cache blocks from the set of non-cache blocks, and wherein the moving of the at least a portion of the stored host data from the at least one cache block to the at least one non-cache block comprises:

moving the at least a portion of the stored host data from the at least one cache block to at least one non-cache zone of the set of non-cache zones, the at least one non-cache zone comprising the at least one non-cache block, the at least one non-cache zone being associated with the single queue identifier.

20. The at least one non-transitory machine-readable storage medium of claim 19, wherein the moving of the at least a portion of the stored host data from the at least one cache block to the at least one non-cache zone comprises storing the single queue identifier in association with the at least one non-cache zone.

\* \* \* \* \*